No. 760,412. PATENTED MAY 24, 1904.
J. W. ARTHUR.
BEET HARVESTER.
APPLICATION FILED APR. 1, 1903.
NO MODEL. 4 SHEETS—SHEET 2.
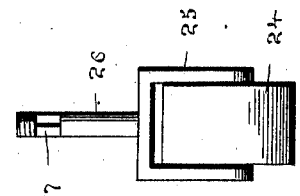
Fig. 7.
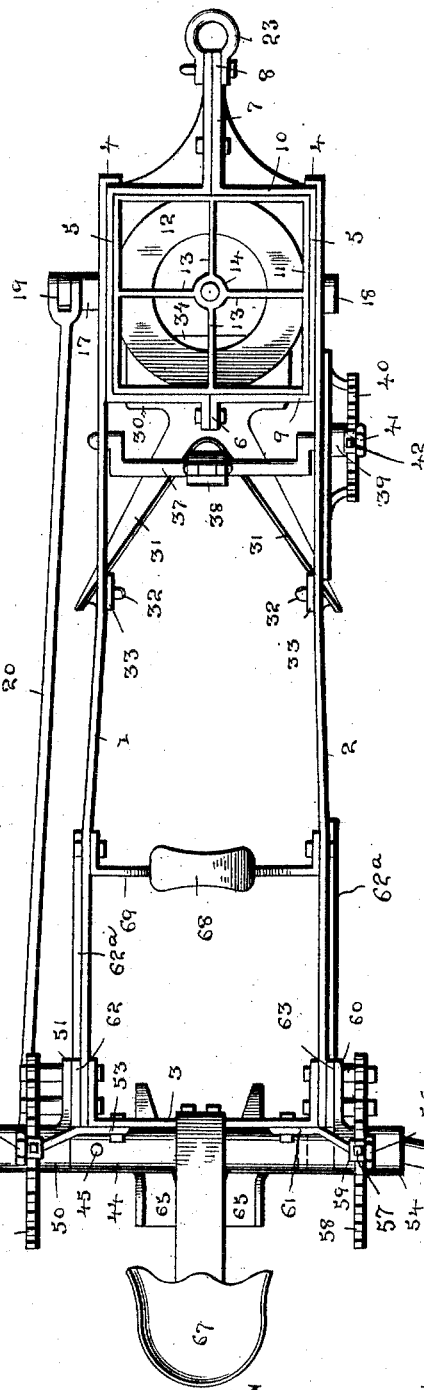
Fig. 2.
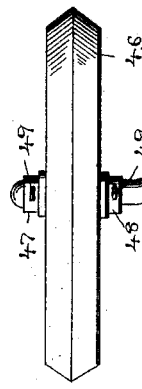
Witnesses
F. W. Riley.
A. G. Heylmun.
Inventor
James W. Arthur.
By Victor J. Evans
Attorney No. 760,412. PATENTED MAY 24, 1904.
J. W. ARTHUR.
BEET HARVESTER.
APPLICATION FILED APR. 1, 1903.
NO MODEL. 4 SHEETS—SHEET 3.
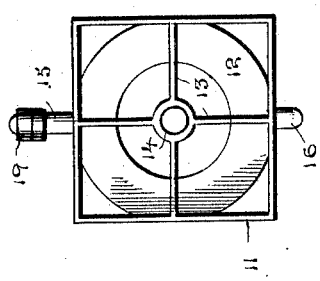
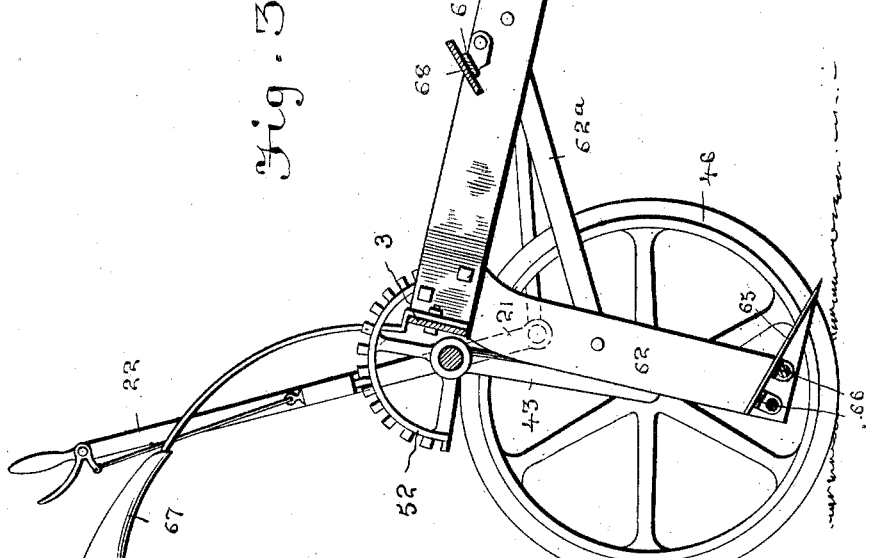
Inventor
James W. Arthur.
By Victor J. Evans
Attorney No. 760,412. PATENTED MAY 24, 1904.
J. W. ARTHUR.
BEET HARVESTER.
APPLICATION FILED APR. 1, 1903.
NO MODEL. 4 SHEETS—SHEET 4.
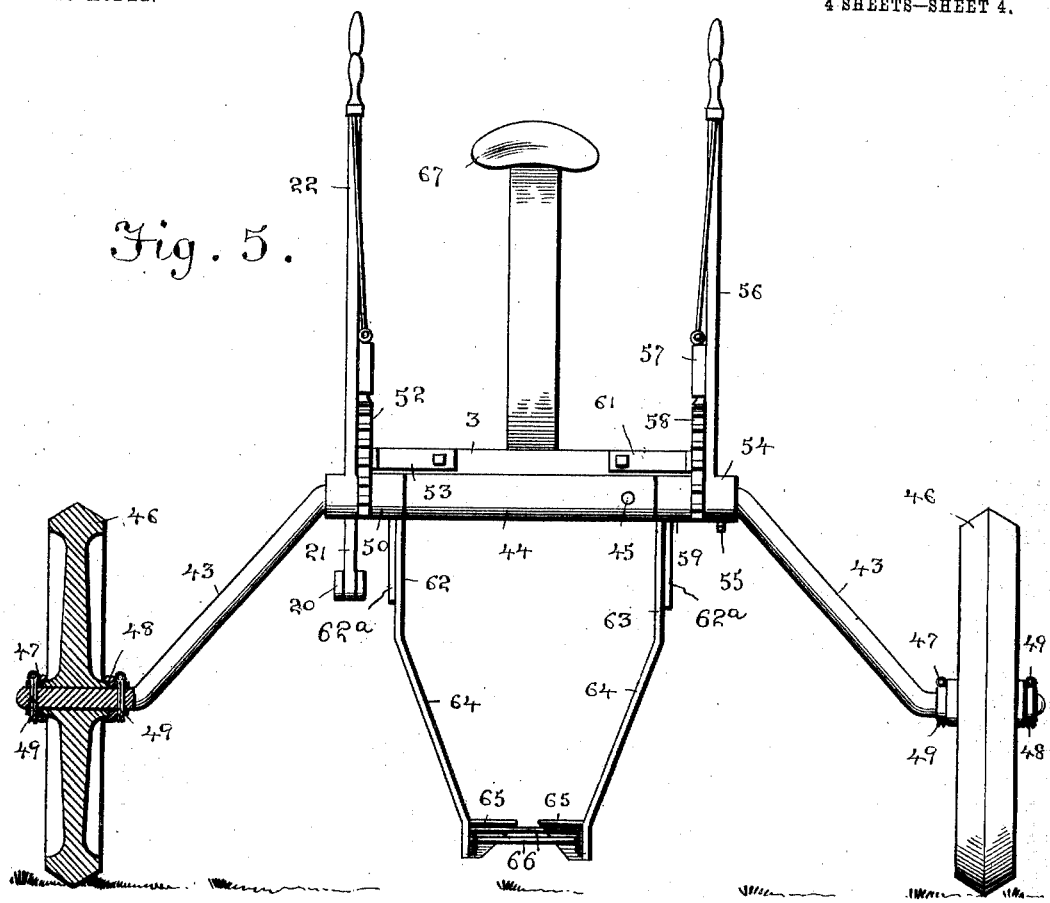
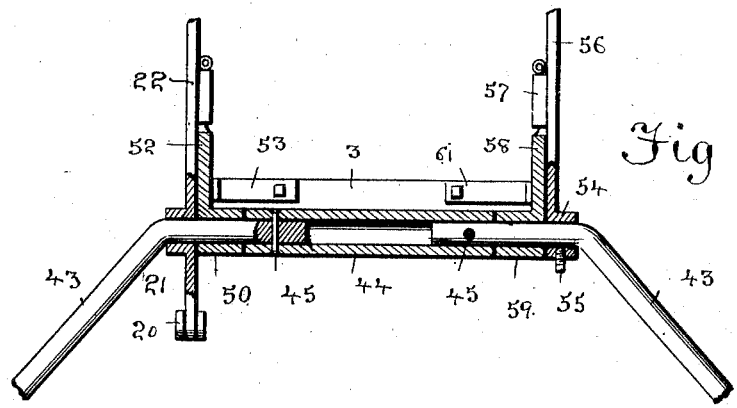
Witnesses
Inventor
James W. Arthur.
By Victor J. Evans
Attorney No. 760,412.　　　　　　　　　　　　　　　　　　　　　　　　　　　Patented May 24, 1904.

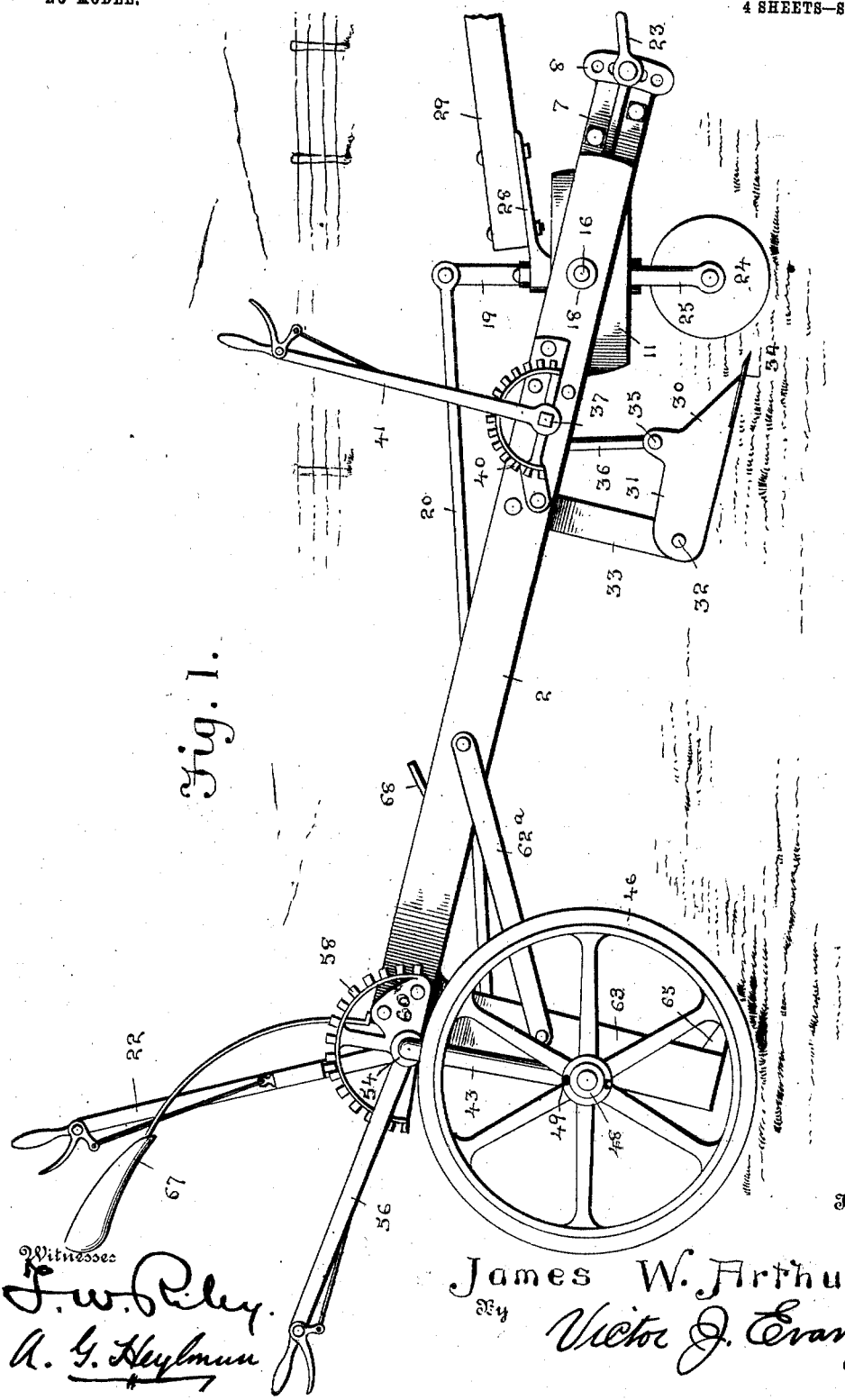

UNITED STATES PATENT OFFICE.

JAMES W. ARTHUR, OF DENVER, COLORADO, ASSIGNOR OF ONE-HALF TO ALBERT LEWIN, OF DENVER, COLORADO.

BEET-HARVESTER.

SPECIFICATION forming part of Letters Patent No. 760,412, dated May 24, 1904.

Application filed April 1, 1903. Serial No. 150,629. (No model.)

*To all whom it may concern:*

Be it known that I, JAMES W. ARTHUR, a citizen of the United States, residing at Denver, in the county of Denver and State of Colorado, have invented new and useful Improvements in Beet-Harvesters, of which the following is a specification.

My invention relates to improvements in diggers for root crops, and is especially designed for lifting sugar-beet crops; and the object is to provide a machine of the kind named and for the purpose intended which is of simplified construction and effective and expeditious in operation.

My invention embodies a mechanism for cutting the plants or leaves free from the beets and a mechanism for digging and lifting the beets free from the ground, which mechanisms are of particular construction, as will be specified.

My invention consists in the novel construction of parts and their assemblage and aggroupment in operative combination, as will be fully specified hereinafter and the novelty particularly pointed out and distinctly claimed.

I have fully and clearly illustrated my invention in the annexed drawings to be taken as a part of this specification, and wherein—

Figure 1 is a side view of the complete machine. Fig. 2 is a top plan view of the machine. Fig. 3 is a longitudinal central section through the machine, showing the adjustable frame for supporting the front end of the machine and leaf-crushing roller and tongue connection. Fig. 4 is a detail plan view of the frame which adjustably supports the front end of the machine. Fig. 5 is a rear elevation of the machine, one of the carrying-wheels being shown in central vertical section to illustrate the means for holding the wheels to the axle. Fig. 6 is a detail view, partly in transverse section, at the rear end of the machine, showing the arrangement of the axles and means for securing them in position. Fig. 7 is a front view in elevation of the beet-top crushing-roller.

In the drawings similar reference notations appearing in the several illustrations designate the same elements.

Referring to the drawings, 1 2 designate the side bars or rails of the carrying and supporting-frame, having their rear ends connected by a plate or bar 3, the parts being secured together by any suitable fastenings, as by bolts and nuts, as shown in the drawings. The material of the frame is flat steel bars of such breadth and thickness as may afford the requisite strength, and in construction of the frame the bars are disposed on their edges, as indicated in the drawings. At the front ends the side bars 1 2 are bent inward at right angles, as at 4, and between the bars is disposed and rigidly secured a rectangular frame 5, made in two equal parts connected on their longitudinal central line at the rear end by means of flanges 6 and at their front end by forwardly-extending braced flanges 7, terminating in a clevis-head 8, the two parts of the frame 5 being strongly secured together by clamping-bolts and nuts, substantially as seen in the drawings. The side pieces of the frame 5 have plain faces and are firmly secured to the inner faces of the side bars 1 and 2 by any suitable means. The end pieces 9 10 are curved or concaved in vertical direction, as shown, to permit the frame posited within the frame 5 to have the requisite rocking movement during the progress of the machine to compensate for the inequalities in the surface of the ground and to provide a pivot for the frame when the rear of the machine is raised or lowered.

11 designates an inner rectangular frame having plain side pieces, the outer faces of which bear against the inner faces of the side pieces of the stationary frame 5, and end pieces, the outer faces of which are convexed coincidently with the concave inner faces of the end pieces 9 10, with which they engage, so as to have a limited rocking movement when arranged in position in the frame 5. The frame 11 is formed with an interior circular ring flange 12 and radial arms 13, arranged diametrically, as shown, the arms carrying a central vertical sleeve 14. From the side pieces of the frame 11 project bearing-studs 15 16, which are arranged in bearings 17 18, made through the side pieces of the frame 5 and the side bars of the main carrying-frame. The bearing-stud 15 is extended beyond its bearing and at its end is formed or provided with a crank-arm 19, to the outer end of which is jointed a pitman or pull-bar 20, the other end of which is pivotally connected to an arm 21 of a lever 22, mounted at the rear end of the machine, and which will be more particularly described hereinafter. It will be perceived that the rockable frame 11 is held in proper horizontal position with relation to the frame 5 and the main frame no matter what the adjustment of the clevis may be. To the clevis-head 8 is hung a clevis 23, which may be placed at any height in the clevis-head, and thus a uniform pressure is given to the roller in leveling the beet-tops. A doubletree equipped with swingletrees may be connected to the clevis for purposes well known.

24 designates a pressing or crushing roller provided with a shaft, the ends of which are journaled in the lower ends of the arms of a yoke 25, from the bridge or cross-bar of which rises a vertical round standard 26, adapted to fit and journal in the sleeve 14, carried by the frame 11 and formed at the juncture of the radial arms 13. The upper end portion of the stem or standard 26 is made square, as at 27, on which the end of the tongue-iron 28 is fitted. The tongue-iron 28 extends forwardly for a suitable distance, as shown, and is fastened to the tongue 29 by bolts. The pressing or crushing roller 24 is made of such breadth that it may follow the row, and the roller serves the purposes of breaking down the tops of the beets preliminary to the action of the clipping-plow.

The top clipping or cutting plow consists of a broad front plate 30, disposed at an incline and from the sides and rear end of which project outwardly-flaring moldboards 31, formed or provided with inwardly-projected lugs 32, which take loosely in apertures made in the lower ends of oppositely-arranged standards 33, having their upper ends firmly secured to the side rails of the main frame, substantially as indicated in the drawings. To the plate 30, at the front and projecting forward a proper distance, is secured the cutting strip or blade 34, having a sharp cutting edge to clip off the tops or leaves of the beets. It will now be seen that in the progression of the machine the blade 34 will clip off the tops from the beets and that the severed portions will ride up over the incline of the clipping-plow and be thrown outward by the outwardly-disposed moldboards free and away from the row, thus leaving the row clear and clean from accumulations of leaves, so that the beets lifted by the rear plow will be readily seen and be ready to be gathered for transportation to the beet-house. To adjust the cut of the clipping-plow, a bar 35 is secured across between and adjacent to the junction of the moldboards, and to this bar is pivotally connected a bar 36, the upper end of which is detachably hung to a crank-shaft 37 by means of a proper hinged bearing-piece 38. The crank-shaft 37 has its bearings in the side rails of the main frame, one end of the crank-shaft being extended through a bearing-sleeve 39, formed in the frame of a sector-rack 40, strongly secured to the side rail of the main frame, and on the squared end of the crank-shaft is mounted a lever 41, which is provided with a well-known spring-actuated bolt 42, operated by the usual pull-rod and bell-crank lever. It will be seen that by moving the lever the crank of the shaft 37 will be raised or lowered accordingly and eventuate in raising or lowering the point of the clipping-plow.

The rear end of the machine is supported on a two-part crank-axle 43, the horizontal approaching ends of which are disposed in a strong sleeve 44, arranged at the rear end of the main frame, substantially as shown in Fig. 5, and said axles are secured in the sleeve by means of bolts 45, passed through the sleeve and end portions of the parts of the axle. On the spindles of the axle are journaled the carrying-wheel 46, which are held on the spindles by and turn between collars 47 48, fastened in position by detachable pins 49, passed through the collars and the spindles of the axle. On the axle is mounted a sleeve 50, formed with a forwardly-extending arm 51, by which it is held rigidly to the frame and against turning on the axle, and is also formed with a sector-rack 52, braced by an arm 53, secured to the rear end piece of the main frame. On the axle immediately adjacent to this sector-rack is pivotally supported the lever 22, provided with a spring-actuated bar to engage between the teeth of rack in a well-known manner. It will be perceived that when the lever 22 is operated the arm 21 and pitman 20 will correspondingly operate the arm 19 and rock the frame 11 on its bearings to assume the required position. On the axle opposite to the lever 22 is mounted a sleeve 54, held rigid to the axle by means of a set-screw 55, and extending from the sleeve 54 is a lever 56, provided with a spring-actuated bolt 57 of the usual kind, which engages with the teeth of a sector-rack 58, mounted loosely on the axle by means of a sleeve 59, which is formed with a forwardly-extending arm 60, whereby it is secured rigidly to the main frame. The sector-rack is also braced and additionally held in position by an inwardly-extending arm 61, fastened to the rear bar or piece of the main frame. It will be perceived that when the lever 56 is moved the axle will be carried forward or rearward and the frame raised or lowered correspondingly, thus regulating the pitch and depth of the beet lifting or digging plows.

62 63 designate the standards of the rear or digging and lifting plow, consisting of flat metal bars having their upper ends disposed between the outer faces of the main frame and the arms 51 and 60 and clamped tight and fast by bolts projected through the assembled parts, as seen in Fig. 2 of the drawings. The standards are arranged at right angles to the side bars of the main frame and have their lower portions directed inward, as at 64, a distance to bring their lower ends to straddle the row of roots in the operation. The front edges of the standards are beveled to a cutting edge to cut through the soil. On the ends of the standards are secured the digging and lifting plows 65, having their shares inclined upward from the points and their inner edges converging until well approaching each other, as indicated in the drawings, the arrangement being such that they may take well under beets and gradually lift them from the soil. The rear ends of the digging-plows are connected by two rods 66, arranged with a space between them, the object being to let the soil fall between them and permit the beets to drop on the surface. The plow-standards 62 are braced in position by brace-pieces 62ª, having one end secured to the standards and the other to the side pieces of the main frame.

A spring-supported seat 67 is mounted at the rear end of the frame and at a proper point is a foot-rest 68, mounted on a brace-bar 69, extending between the side bars or rails of the main frame.

The functions and operation of the several elements and parts have been stated in the purview of the description; but the combined and consecutive operation may be compiled as follows: The proper adjustments of the front end of the main frame may first be made by the lever 22 and its connections with the rocking frame 11. Then the clipping-plow is adjusted to the proper height to clip off the tops on the general horizontal line of progression, and then the digging plows are set to the desired position by the lever 56 acting as heretofore stated, and the machine is in condition for clearing and digging. As the machine progresses in the work the pressing-roller 24 crushes the tops, the clipping-plow follows and cuts off the tops and carries them away from the row, and then in succession the digging-plows encounter the beets, lifting them from the ground and delivering them on the surface ready to be gathered up.

Having thus described the invention, what is claimed as new is—

1. In a beet-digging machine, a main frame, beet topping and digging means carried by said frame, a rectangular frame rigidly fixed at the front end of the main frame and having concaved end pieces, a movable rectangular frame arranged within the fixed frame and having convex end pieces coincident to the end pieces of the fixed frame, a vertical sleeve supported by the movable frame, a pressing-roller, a yoke in which the roller is journaled and having a spindle journaled in said bearing-sleeve, and means to rock and hold the movable frame with relation to the main frame.

2. In a beet-digging machine, the combination with an axle, of a main frame supported at its rear end upon said axle and vertically adjustable with relation thereto, beet topping and digging means carried by said frame, a fixed rectangular frame at the front end of the main frame having concave end pieces, a movable rectangular frame arranged within the fixed frame and having convex end pieces coincident to the end pieces of the fixed frame a vertical sleeve supported by the movable frame, a pressing-roller, a yoke in which the roller is journaled and having a spindle journaled in said bearing-sleeve and extending above said sleeve, a draft means secured to the upper portion of said spindle, and means to rock and hold the movable frame with relation to the main frame.

3. In a beet-digging machine, the combination with an axle of a main frame supported at its rear end on the axle and vertically adjustable with relation thereto, beet topping and digging means carried by said frame, a rectangular frame fixed to the forward end of the main frame and having concave end pieces and bearings in its side pieces, a movable rectangular frame within the fixed frame having convex end pieces coincident with the end pieces of the fixed frame, and bearing-studs journaled in the bearings in said fixed frame, and means to swing the inner frame on its bearings.

4. In a beet-digging machine, the combination with an axle, of a main frame supported at its rear end on the axle and vertically adjustable with relation thereto, beet topping and digging means carried by the frame, a fixed frame supported at the forward end of the main frame, a movable frame arranged within the fixed frame and having a rocking movement therein, and means to rock said frame.

In testimony whereof I affix my signature in presence of two witnesses.

JAMES W. ARTHUR.

Witnesses:
 AL. NEUMAN,
 JOHN McCLAY.